W. Lamb,
Water Wheel.
Nº 2,546.      Patented Apr. 11, 1842.
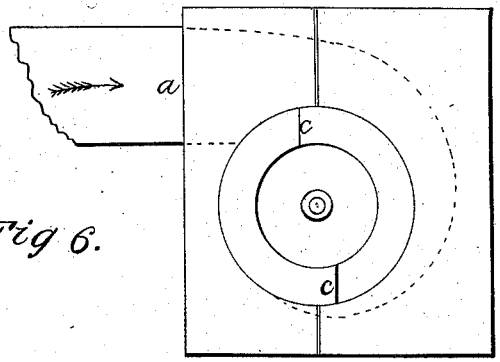
Fig 6.
Fig 3.
Fig 4.
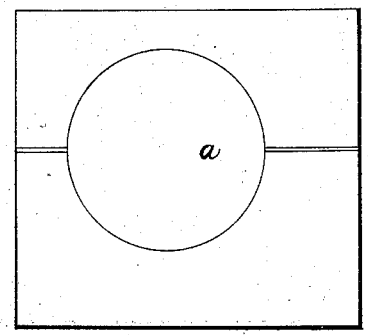
Fig 2.
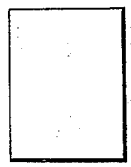
Fig 5.
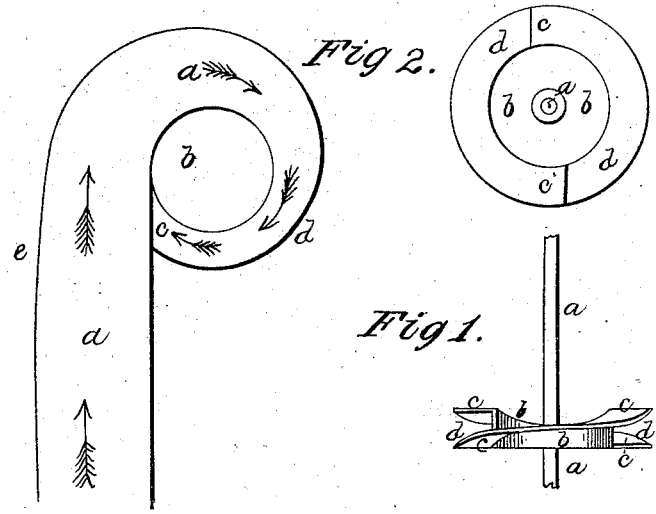
Fig 1.

UNITED STATES PATENT OFFICE.

WILLIAM LAMB, OF WHITESTOWN, NEW YORK.

IMPROVEMENT IN WATER-WHEELS.

Specification forming part of Letters Patent No. 2,546, dated April 11, 1842.

*To all whom it may concern:*

Be it known that I, WILLIAM LAMB, of Whitestown, in the county of Oneida and State of New York, have invented an Improved Water-Wheel for Propelling Machinery, in combination with a trunk or cistern for the same; and I do hereby declare that the following is a full and exact description.

My wheel is made with floats having the same position in relation to the shaft that the thread of a screw has to its body or stem. The wheel may be made with one, two, three, or four floats (as circumstances may require) and a corresponding number of vents, and each kind of wheel would be represented by a small section of a screw having as many separate threads as the wheel has floats. The water is discharged on the top or flat side of the wheel, the vent or vents being between the extremities of the float or floats and of a size to suit the circumstances, the extremities of the floats being made to pass by or lap each other sufficiently to give the water in its discharge a proper direction. The wheel is then made to revolve in a circular opening in a plank or timber trunk or cistern, which opening is made nicely to fit the outside or circumference of the wheel, so that it may freely turn, and yet but little water escape between the wheel and plank. The trunk or cistern is to be of a size suited to the wheel, and its vents (about six times as large as all the vents) to be made in a coiled or scroll form, so as to conduct the water under the floats and around the wheel in the same direction the wheel runs, diminishing gradually in size at that part of it immediately connected with the wheel by having the outside gradually drawn in or the bottom gradually elevated, or both, so that the size of the trunk at any given point may be adapted to the quantity of water remaining undischarged at that point, and thus causing the water to rise toward the wheel as it advances through the coiled part of the trunk and bringing the current of water as well as its pressure to act on the floats on their under side in a direction nearly in line with the plane of motion.

The accompanying drawings present views of a wheel with two floats and of the coiled trunk both separately and combined.

No. 1 is a side view showing the general form of the wheel, of which $a\ a$ is the shaft; $b\ b$, the body with a hollow on the upper side; $c\ c$, the floats passing round the body like the threads of a screw, and $d\ d$ the vents or places of discharge.

No. 2 is a view of the same wheel as seen on the top or flat side. $a$ is the hole through the body of the wheel for the shaft; $b\ b$, the body of the wheel with a concavity in the top to avoid the use of any more metal than strength requires; $c\ c$, the upper ends of the floats; $d\ d$, the lower ends of the same which pass under the other ends far enough to make a sufficient lap.

No. 3 is a view of the top of the trunk or cistern, showing the opening $a$ in which the wheel revolves.

No. 4 is a transverse section of the straight part of the trunk, showing its depth and width.

No. 5 is a view of the inside or bottom of the trunk as it appears when looked down upon from above. $a\ a$ is the bottom over which the water passes in the direction of the arrows around a stem to $c$. $b$ is the stem around which the trunk is coiled, and is of such a size and height as to occupy the space directly under the body of the wheel. From $e$ to $d$ the outside of the trunk is gradually drawn in, and from $d$ to $c$ the bottom is gradually elevated, being at $c$ of the same height as the stem $b$ or as high as the bottom of the wheel.

No. 6 represents the parts Nos. 2, 3, and 5 combined as looked down upon from above. The top No. 3 is placed upon the trunk No. 5, and the wheel No. 2 set into the opening of the top. The water passing into the trunk at $a$ carries the wheel around by its pressure and velocity in the same direction with its current and is discharged at the vents under $c\ c$.

I shall not confine myself to the proportions represented in the drawings. I may sometimes make trunks of the same or about the same width as the floats and deep enough to admit a sufficient quantity of water, or may sometimes make them about the width of the floats at the top and broad at the base, varying the shape to the circumstances. The trunk may be made of wood or of metal or a part of each. In some cases I would have the wheel run in an iron rim to which it had been nicely fitted and that rim placed on the outside of the trunk, instead of having it run in the opening in the plank, as described above, and in some cases I would have that outside rim made fast to the wheel or cast whole with it, and then place the wheel on the outside of the trunk or cistern.

The wheel is designed to run under water, and may be used with a perpendicular or horizontal shaft and one or more upon the same shaft.

When made of iron, the wheel may be molded and cast whole or in parts.

The coiled or scrolled trunk affords the advantage of the current of water passing through the trunk by bringing it in contact with the floats in the same direction with the motion of the wheel, which advantage is lost in the common trunk by the water coming against the end of the trunk and passing out at nearly a right angle with its current. The friction between the water and the wheel is also greatly lessened, and by experiment it is found that the same wheel runs about one-fifth faster in the coiled than in the common or square trunk.

What I claim as my invention, and desire to secure by Letters Patent, is—

The construction of water-wheels designed to run under water with one, two, or more floats so placed in relation to the shaft and body of the wheel as to form a short transverse section of a screw of one, two, or more threads, respectively, to be made of any suitable metal and of a shape that may be molded and cast whole, or to be made of wood or part of each, in combination with a coiled or scroll trunk so made as to bring the water in contact with one side of the wheel and conduct it around the wheel in the direction the wheel runs, (except what is discharged in its passage,) the trunk being diminished in size gradually by drawing in the side or sides or by gradually raising the bottom, or both, so that the size of the trunk at any given point shall be adapted to the quantity of water remaining undischarged at that point in its passage around the wheel under the floats, said trunk to be made of metal or wood or part of each and of a size and form best adapted to the circumstances.

WILLIAM LAMB.

Witnesses:
HIRAM ELMER,
H. H. EASTMAN.